US012804660B2

(12) United States Patent
Li et al.

(10) Patent No.: US 12,804,660 B2
(45) Date of Patent: Nov. 17, 2026

(54) METHODS OF CODEBOOK BASED AND NON-CODEBOOK BASED PUSCH TRANSMISSION AND RELATED DEVICES

(71) Applicant: Huizhou TCL Cloud Internet Corporation Technology Co., Ltd., Huizhou (CN)

(72) Inventors: Tian Li, Huizhou (CN); Jia Sheng, Huizhou (CN)

(73) Assignee: Huizhou TCL Cloud Internet Corporation Technology Co., Ltd., Huizhou (CN)

( * ) Notice: Subject to any disclaimer, the term of this patent is extended or adjusted under 35 U.S.C. 154(b) by 266 days.

(21) Appl. No.: 18/707,164

(22) PCT Filed: Nov. 4, 2021

(86) PCT No.: PCT/CN2021/128797
§ 371 (c)(1),
(2) Date: May 2, 2024

(87) PCT Pub. No.: WO2023/077382
PCT Pub. Date: May 11, 2023

(65) Prior Publication Data

US 2026/0164440 A1 Jun. 11, 2026

(51) Int. Cl.

*H04L 5/00* (2006.01)
*H04W 72/21* (2023.01)
*H04W 72/232* (2023.01)

(52) U.S. Cl.

CPC .......... *H04W 72/21* (2023.01); *H04L 5/0051* (2013.01); *H04W 72/232* (2023.01)

(58) Field of Classification Search

CPC .. H04W 72/21; H04W 72/232; H04L 5/0051; H04B 7/0691; H04B 7/0404

See application file for complete search history.

(56) References Cited

U.S. PATENT DOCUMENTS

2020/0336998 A1 10/2020 Rahman et al.
2020/0351129 A1 11/2020 Kwak et al.

FOREIGN PATENT DOCUMENTS

CN 110536394 A 12/2019
EP 3879738 A1 9/2021

(Continued)

OTHER PUBLICATIONS

European Search Report in European application No. 21962899.7, mailed on Jun. 5, 2025.

(Continued)

*Primary Examiner* — Thai Nguyen
(74) *Attorney, Agent, or Firm* — PV IP PC; Wei Te Chung

(57) ABSTRACT

Methods of codebook based and non-codebook based PUSCH transmission are related devices are provided. The method includes being provided with a first SRS resource set corresponding to a first TRP and a second SRS resource set corresponding to a second TRP, in which the first SRS resource set and the second SRS resource set are configured with usage set to codebook based PUSCH transmission in multi-TRP/panel scenario; and performing virtualization of Tx chains based on the first SRS resource set and the second SRS resource set to support full power transmission. The method can realize codebook based PUSCH transmission in multi-TRP/panel scenario.

16 Claims, 6 Drawing Sheets

(56) References Cited

FOREIGN PATENT DOCUMENTS

| | | | | |
|---|---|---|---|---|
| WO | 2020093362 A1 | 5/2020 | | |
| WO | 2021164634 A1 | 8/2021 | | |
| WO | WO-2022204364 A1 * | 9/2022 | ............... | H04L 1/08 |

OTHER PUBLICATIONS

International Search Report in International application No. PCT/CN2021/128797, mailed on Jul. 22, 2022.

Written Opinion of the International Search Authority in International application No. PCT/CN2021/128797, mailed on Jul. 27, 2022.

NEC. "Discussion on multi-TRP for PDCCH, PUCCH and PUSCH" 3GPP TSG RAN WG1 #104b-e R1-2103522, Apr. 20, 2021(Apr. 20, 2021), section 2.

VIVO. 'Enhancements on Multi-TRP for PUCCH and PUSCH 3GPP TSG RAN WG1 #105-e R1-2104344, May 27, 2021(May 27, 2021), section 3.

Apple Inc. On Multi-TRP Reliability Enhancement 3GPP TSG-RAN WG1 Meeting #106b-e R1-2110014, Oct. 19, 2021(Oct. 19, 2021), sections 4-5.

* cited by examiner

| SRS resource set #0 |
| --- |
| SRS resource #0 with 1 port |
| SRS resource #1 with 2 port |

| SRS resource set #1 |
| --- |
| SRS resource #0 with 2 port |
| SRS resource #1 with 4 port |

METHODS OF CODEBOOK BASED AND NON-CODEBOOK BASED PUSCH TRANSMISSION AND RELATED DEVICES

CROSS-REFERENCE TO RELATED APPLICATIONS

This application is a national phase application of International Application no. PCT/CN2021/128797 field on Nov. 4, 2021. The content of the aforementioned application is incorporated herein by reference in its entirety.

TECHNICAL FIELD

The present application relates to wireless communication, and more particularly, to methods of codebook based and non-codebook based physical uplink shared channel (PUSCH) transmission, and related devices such as a user equipment (UE) and a transmission/reception point (TRP) (e.g., a gNB).

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN includes a set of base stations (BSs) which provide wireless links to the UEs located in cells covered by the base stations, and an interface to a core network (CN) which provides overall network control. The RAN and CN each conducts respective functions in relation to the overall network.

The 3GPP has developed the so-called Long-Term Evolution (LTE) system, namely, an Evolved Universal Mobile Telecommunication System Territorial Radio Access Network (E-UTRAN), for a mobile access network where one or more macro-cells are supported by base station knowns as an eNodeB or eNB (evolved NodeB). More recently, LTE is evolving further towards the so-called 5G or NR (new radio) systems where one or more cells are supported by base stations known as a next generation Node B called gNodeB (gNB).

The 5G New Radio (NR) standard will support a multitude of different services each with very different requirements. These services include Enhanced Mobile Broadband (eMBB) for high data rate transmission, Ultra-Reliable Low Latency Communication (URLLC) for devices requiring low latency and high link reliability and Massive Machine-Type Communication (mMTC) to support a large number of low-power devices for a long life-time requiring highly energy efficient communication.

To exploit multiple path propagation, multiple input multiple output (MIMO) is a method for multiplying the capacity of a radio link using multiple transmission and receiving antennas. By deploying multiple antennas at the transmitter and the receiver, MIMO refers to a practical technique for sending and receiving more than one data signal simultaneously over the same radio channel, which improves the performance of spectral efficiency greatly.

An overview is given below about what progress has been achieved to enable the use of transmission schemes for uplink transmission (e.g., SRS transmission, PUSCH transmission) in an efficient manner.

As shown in the FIG. 1, for a user equipment (UE) operating in multi-TRP/panel transmission in NR, sounding reference signal (SRS) can be transmitted in different transmission occasions toward different TRPs so that UE has multiple chances to transmit SRS. In addition, multiple SRS can be transmitted from multiple panels simultaneously toward multiple TRPs. SRS transmission targeting towards different TRPs can avoid possible blockage between any TRP and the UE. As a result, SRS transmission towards multiple TRPs not only enhances the reliability but also improves the coverage.

As shown in the FIG. 2, for a UE operating in multi-TRP/panel transmission in NR, PUSCH can be transmitted toward different TRPs so that gNB has multiple chances to receive PUSCH. PUSCH transmission received from multiple TRPs not only enhances the reliability but also improve the coverage. Regarding the single-downlink control information (DCI) based PUSCH transmission in multi-TRP/panel scenario, the PUSCH transmissions toward two TRPs are scheduled by single DCI, where single-DCI based multi-TRP PUSCH transmission is beneficial when different TRPs are connected by ideal backhaul.

As shown in the FIG. 3, the UE is configured with 2 Tx ports. Since UE is likely power limited in some scenarios (e.g., cell-edged UE), in order to support full power transmission, UE can virtualize two Tx chains into the single port SRS resource. By this way, UE could transmit up to 23 dBm for a rank 1 transmission, for example. In addition, other SRS resources with different number of ports can be configured in a SRS resource set to allow more virtualization flexibility. By this way, UE could support full power transmission for each rank.

In Rel-15/16, two transmission schemes are supported for PUSCH, i.e., codebook based PUSCH transmission and non-codebook based PUSCH transmission. Codebook based PUSCH transmission is configured if the higher layer parameter txConfig in pusch-Config is set to 'codebook', while non-codebook based PUSCH transmission is configured if the higher layer parameter txConfig is set to 'nonCodebook'.

However, the codebook based PUSCH transmission and non-codebook based PUSCH transmission need to be further developed in multi-TRP/panel scenarios and needs further improvements.

SUMMARY

The objective of the present application is to provide a method of codebook based physical uplink shared channel (PUSCH) transmission and a method of non-codebook based physical uplink shared channel (PUSCH) transmission, and related devices for solving the problems in the existing arts.

In a first aspect, an embodiment of the present application provides a method of codebook based PUSCH transmission, performed by a user equipment (UE), the method comprising: being provided with a first sounding reference signal (SRS) resource set corresponding to a first transmission/reception point (TRP) and a second SRS resource set corresponding to a second TRP, in which the first SRS resource set and the second SRS resource set are configured with usage set to codebook based PUSCH transmission in multi-TRP/panel scenario; and performing virtualization of Tx chains based on the first SRS resource set and the second SRS resource set to support full power transmission.

In a second aspect, an embodiment of the present application provides a method of non-codebook based PUSCH transmission, performed by a user equipment (UE), the method comprising: being provided with one or two sounding reference signal (SRS) request fields in downlink control information (DCI) to trigger a first aperiodic (AP) SRS resource set transmitted toward a first transmission/reception point (TRP) and a second AP SRS resource set transmitted toward a second TRP, in which the first AP SRS resource set and the second AP SRS resource set are configured with usage set to non-codebook based PUSCH transmission in multi-TRP/panel scenario; and performing AP SRS transmission based on the first AP SRS resource set and the second AP SRS resource set.

In a third aspect, an embodiment of the present application provides a method of enabling a user equipment (UE) to perform codebook based PUSCH transmission, performed by a transmission/reception point (TRP), the method comprising: providing for the UE a first sounding reference signal (SRS) resource set corresponding to a first TRP and a second SRS resource set corresponding to a second TRP, in which the first SRS resource set and the second SRS resource set are configured with usage set to codebook based PUSCH transmission in multi-TRP/panel scenario; and expecting the UE to perform virtualization of Tx chains based on the first SRS resource set and the second SRS resource set to support full power transmission.

In a fourth aspect, an embodiment of the present application provides a method of enabling a user equipment (UE) to perform non-codebook based PUSCH transmission, performed by a transmission/reception point (TRP), the method comprising: providing for the UE one or two sounding reference signal (SRS) request fields in downlink control information (DCI) to trigger a first aperiodic (AP) SRS resource set transmitted toward a first transmission/reception point (TRP) and a second AP SRS resource set transmitted toward a second TRP, in which the first AP SRS resource set and the second AP SRS resource set are configured with usage set to non-codebook based PUSCH transmission in multi-TRP/panel scenario; and expecting the UE to perform AP SRS transmission based on the first AP SRS resource set and the second AP SRS resource set.

In a fifth aspect, an embodiment of the present application provides a UE, communicating with a TRP in a network, the UE including a processor, configured to call and run program instructions stored in a memory, to execute the method of the first aspect.

In a sixth aspect, an embodiment of the present application provides a UE, communicating with a TRP in a network, the UE including a processor, configured to call and run program instructions stored in a memory, to execute the method of the second aspect.

In a seventh aspect, an embodiment of the present application provides a TRP, communicating with a UE in a network, the TRP including a processor, configured to call and run program instructions stored in a memory, to execute the method of the third aspect.

In an eighth aspect, an embodiment of the present application provides a TRP, communicating with a UE in a network, the TRP including a processor, configured to call and run program instructions stored in a memory, to execute the method of the fourth aspect.

In a ninth aspect, an embodiment of the present application provides a computer readable storage medium provided for storing a computer program, which enables a computer to execute the method of any of the first to the fourth aspects.

In a tenth aspect, an embodiment of the present application provides a computer program product, which includes computer program instructions enabling a computer to execute the method of any of the first to the fourth aspects.

In an eleventh aspect, an embodiment of the present application provides a computer program, when running on a computer, enabling the computer to execute the method of any of the first to the fourth aspects.

DESCRIPTION OF DRAWINGS

In order to more clearly illustrate the embodiments of the present application or related art, the following figures that will be described in the embodiments are briefly introduced. It is obvious that the drawings are merely some embodiments of the present application, a person having ordinary skill in this field can obtain other figures according to these figures without paying the premise.

DETAILED DESCRIPTION OF EMBODIMENTS

Figure 1:
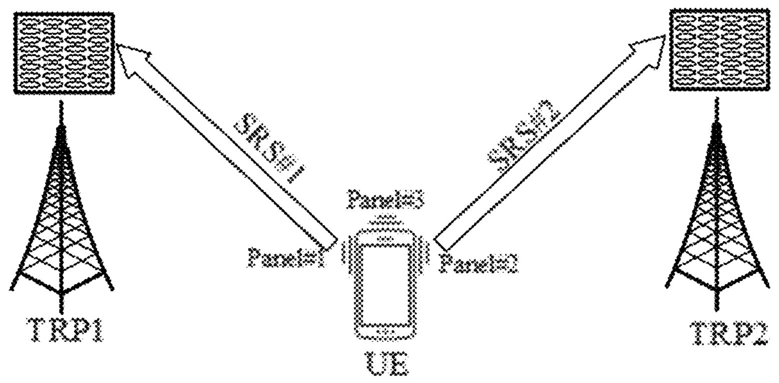
FIG. 1 is a schematic diagram illustrating Multi-TRP/panel based SRS transmission.
Figure 2:
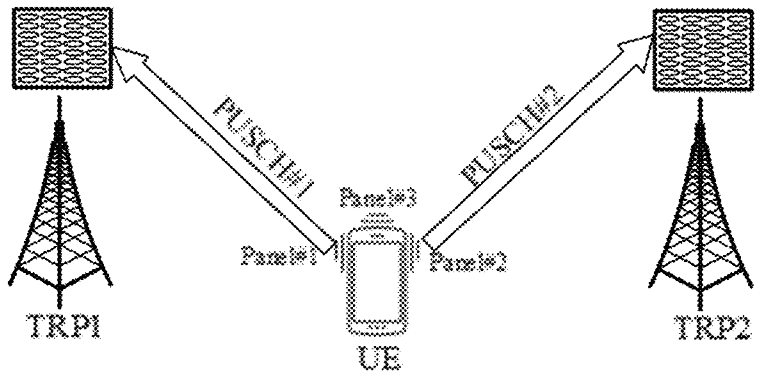
FIG. 2 is a schematic diagram illustrating Multi-TRP/panel based PUSCH transmission.
Figure 3:
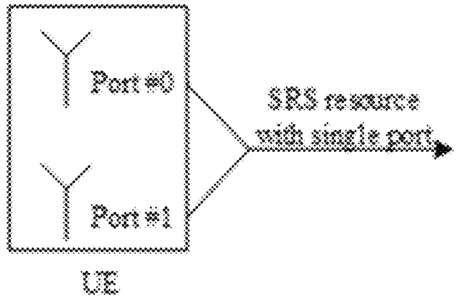
FIG. 3 is a schematic diagram illustrating Tx ports virtualization.

Embodiments of the disclosure are described in detail with the technical matters, structural features, achieved objects, and effects with reference to the accompanying drawings as follows. Specifically, the terminologies in the embodiments of the present application are merely for describing the purpose of the certain embodiment, but not to limit the disclosure.

In this document, the term "/" should be interpreted to indicate "and/or." As used herein in the specification and in the claims, the phrase "at least one" is in reference to one or more elements.

The following table includes some abbreviations and definition, which may be used in some embodiments of the present application:

| Abbreviation/Definition | Description |
|---|---|
| 3GPP | Third Generation Partnership Project |
| AP | Aperiodic |
| CSI-RS | Channel State Information Reference Signal |
| DCI | Downlink Control Information |
| gNB | Generation Node B |
| NCJT | Non-Coherent Joint Transmission |
| NR | New Radio |
| OFDM | Orthogonal Frequency Division Multiplexing |
| RAN | Radio Access Network |
| Rel | Release |
| RRC | Radio Resource Control |
| SRS | Sounding Reference Signal |
| TRP | Transmission/Reception Point |
| Tx | Transmission |
| UE | User Equipment |
| UL | uplink |

In Rel-16, for codebook based PUSCH transmission in single-TRP/panel scenario, the UE can be configured with one SRS resource or multiple SRS resources with different number of SRS ports within a SRS resource set which usage is set to 'codebook'. Through the virtualization of Tx chains, UE can support full power transmission for each rank. However, for codebook based multi-TRP/panel based PUSCH repetition, since two SRS resource sets are configured for the two TRP respectively, it is essential to define the rule to configure the number of SRS ports for the two SRS resource sets.

In Rel-15, for the non-codebook based PUSCH in single TRP scenario, since channel reciprocity is exploited, AP SRS resource set toward two TRPs can be triggered and UE can apply the precoder for the AP SRS transmission based on the associated CSI-RS resource. For the multi-TRP/panel based scenario, since the channels toward the two TRPs may be different, it is essential to design AP SRS resource set activation mechanism toward two TRPs and different CSI-RS resources for the AP SRS transmissions toward two TRPs.

This application is related to the wireless communication systems operating in multiple input multiple output (MIMO) systems. More specifically, the target is the improvement of transmission schemes for PUSCH transmission in multi-TRP scenario. This application proposes some methods which are particularly interesting for enhancing the support of transmission schemes for PUSCH transmission in multi-TRP scenario.

The main idea of this disclosure is to provide a new design for transmission schemes for PUSCH transmission, through which the transmitter is allowed to apply the transmission schemes for PUSCH transmission in multi-TRP scenario. In this disclosure, several solutions are proposed to apply the transmission schemes for PUSCH transmission in multi-TRP scenario, which include codebook based PUSCH transmission and non-codebook based PUSCH transmission. First of all, regarding the codebook based PUSCH transmission, several methods are designed to configure the port number for the two SRS resource sets toward two TRPs respectively. Secondly, regarding non-codebook based PUSCH transmission, several methods are designed to enhance the non-codebook based PUSCH transmission, i.e., AP SRS resource sets activation toward two TRPs, configuration of the associated CSI-RS resource for the AP SRS transmissions toward the two TRPs. Taking these methods into consideration, the support for transmission schemes for PUSCH transmission in multi-TRP scenario is greatly enhanced.

Figure 4:
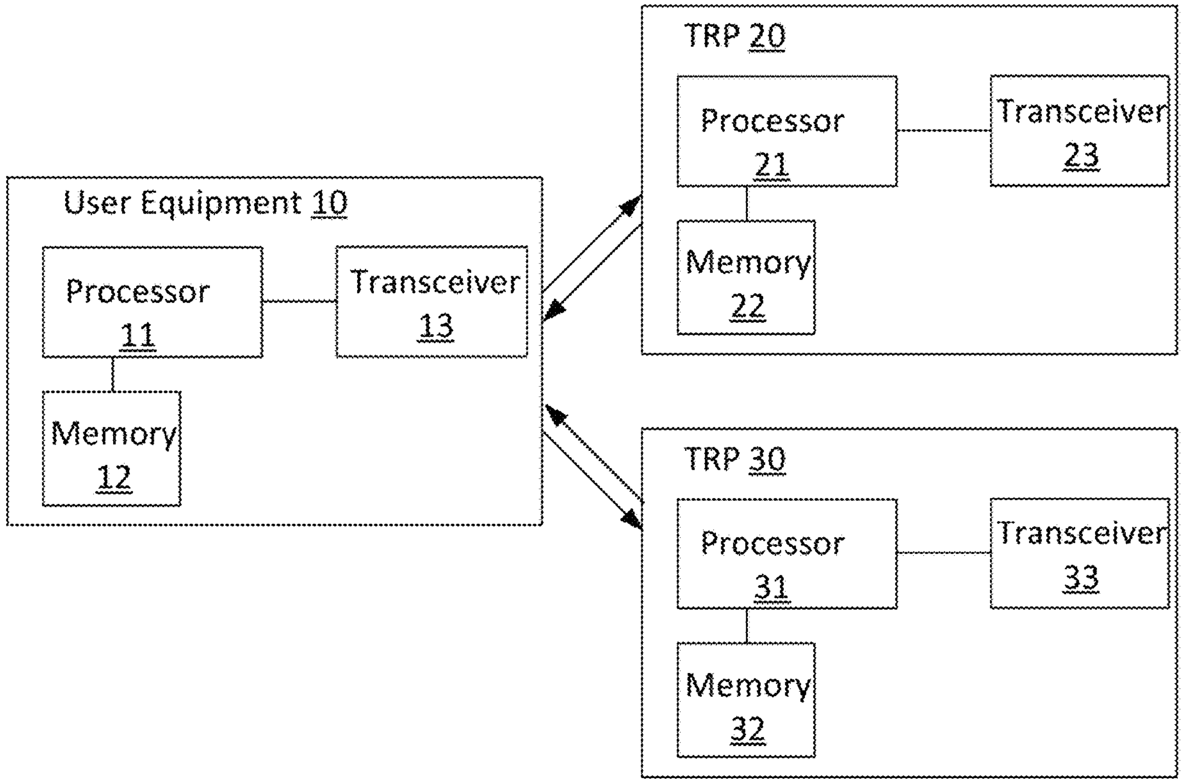
FIG. 4 is a schematic block diagram illustrating a communication network system according to an embodiment of the present application.

FIG. 4 illustrates that, in some embodiments, one or more user equipments (UEs) 10, a first transmission/reception point (TRP) (e.g., gNB) 20 and a second TRP (e.g., gNB) 30 for wireless communication in a communication network system according to an embodiment of the present application are provided. The communication network system includes the one or more UEs 10, the first TRP 20 and the second TRP 30. The one or more UEs 10 may include a memory 12, a transceiver 13, and a processor 11 coupled to the memory 12 and the transceiver 13. The first TRP 20 may include a memory 22, a transceiver 23, and a processor 21 coupled to the memory 22 and the transceiver 23. The second TRP 30 may include a memory 32, a transceiver 33, and a processor 31 coupled to the memory 32 and the transceiver 33. The processor 11 or 21 or 31 may be configured to implement proposed functions, procedures and/or methods described in this description. Layers of radio interface protocol may be implemented in the processor 11 or 21 or 31. The memory 12 or 22 or 32 is operatively coupled with the processor 11 or 21 or 31 and stores a variety of information to operate the processor 11 or 21 or 31. The transceiver 13 or 23 or 33 is operatively coupled with the processor 11 or 21 or 31, and the transceiver 13 or 23 or 33 transmits and/or receives a radio signal.

The processor 11 or 21 or 31 may include application-specific integrated circuit (ASIC), other chipset, logic circuit and/or data processing device. The memory 12 or 22 or 32 may include read-only memory (ROM), random access memory (RAM), flash memory, memory card, storage medium and/or other storage device. The transceiver 13 or 23 or 33 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 or 32 and executed by the processor 11 or 21 or 31. The memory 12 or 22 or 32 can be implemented within the processor 11 or 21 or 31 or external to the processor 11 or 21 or 31 in which case those can be communicatively coupled to the processor 11 or 21 or 31 via various means as is known in the art.

Figure 5:
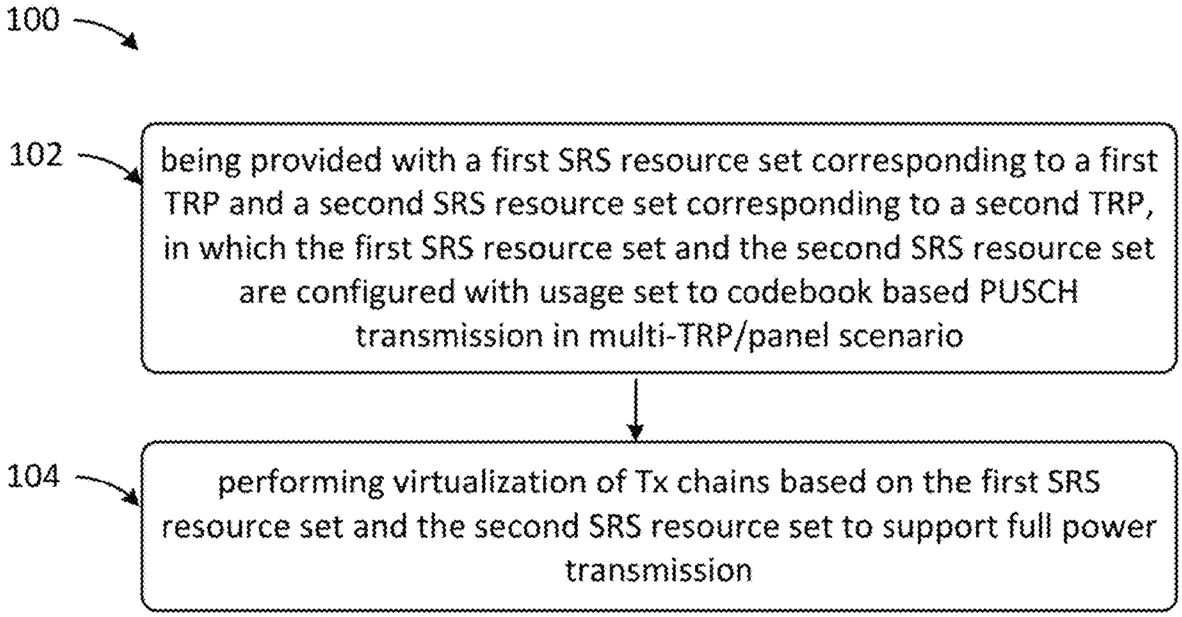
FIG. 5 is a flowchart of a method of codebook based PUSCH transmission according to an embodiment of the present application.

FIG. 5 illustrates a method 100 of codebook based PUSCH transmission according to an embodiment of the present application. In some embodiments, referring to FIG. 5 in conjunction with FIG. 4, the method 100 includes the following. In block 102 of the method 100, the UE 10 is provided (a TRP (e.g., the first TRP 20 or the second TRP 30) provides for the UE 10) with a first sounding reference signal (SRS) resource set corresponding to the first TRP 20 and a second SRS resource set corresponding to the second TRP 30, in which the first SRS resource set and the second SRS resource set are configured with usage set to codebook based PUSCH transmission in multi-TRP/panel scenario. In block 104 of the method 100, the UE 10 performs (a TRP (e.g., the first TRP 20 or the second TRP 30) expects the UE 10 to perform) virtualization of Tx chains based on the first SRS resource set and the second SRS resource set to support full power transmission. This can solve issues in the existing arts, realize codebook based PUSCH transmission in multi-TRP/panel scenario, and/or provide good communication performance.

In an embodiment of the present application, the number of SRS ports for SRS resources in the first SRS resource set and the number of SRS ports for the SRS resources in the second SRS resource set are configured with a same value.

In an embodiment of the present application, the SRS resources in the first SRS resource set is configured with same or different number of SRS ports and SRS resources in the second SRS resource set is configured with same or different number of SRS ports. More particularly, two SRS resources with a same order in the first SRS resource set and the second SRS resource set are configured with a same number of SRS ports.

In one possible implementation of the present application, similar virtualization of Tx chains into the SRS ports of SRS resources in the first SRS resource set and the second SRS resource set is performed if channels toward the first and second TRP are similar. In one possible implementation of the present application, different virtualization of Tx chains into the SRS ports of SRS resources in the first SRS resource set and the second SRS resource set is performed if the channels toward the first and second TRP are different.

In an embodiment of the present application, the SRS resources in the first SRS resource set is configured with same or different number of SRS ports and SRS resources in the second SRS resource set is configured with same or different number of SRS ports. More particularly, the number of SRS ports of SRS resources in the first SRS resource set and the second SRS resource set are configured independently.

In one possible implementation of the present application, no limitation is given on the relationship between configuration of the number of SRS ports of SRS resources in the first SRS resource set and configuration of the number of SRS ports of SRS resources in the second SRS resource set. In one possible implementation of the present application, independent virtualization of Tx chains into the SRS ports of SRS resources in the first SRS resource set and the second SRS resource set is performed.

Figure 6:
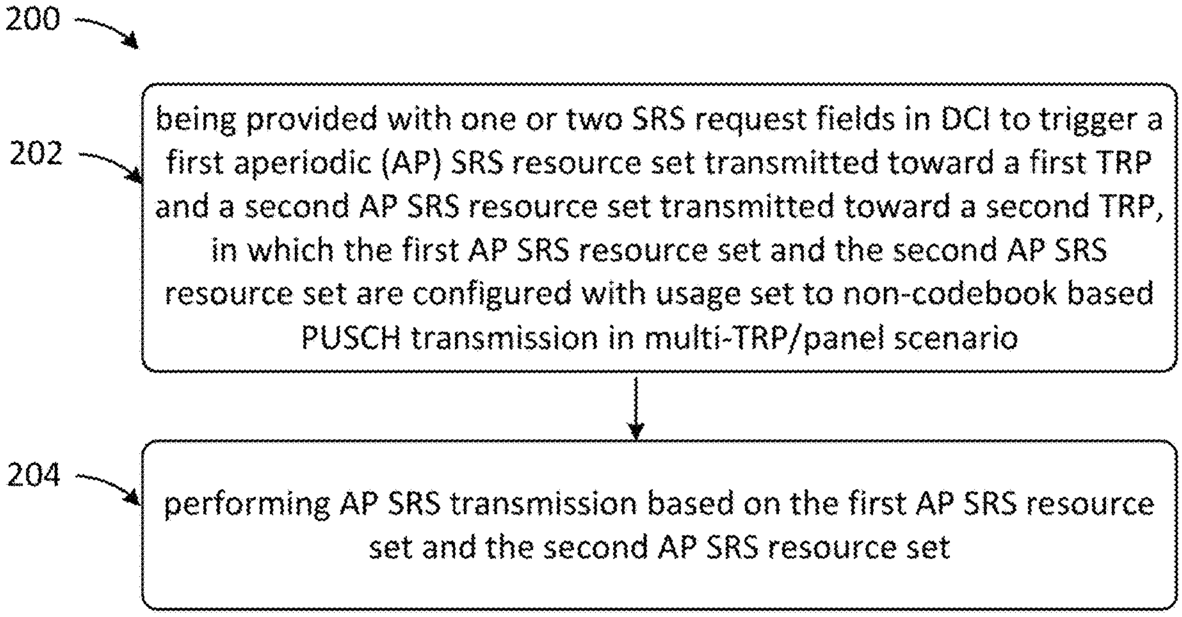
FIG. 6 is a flowchart of a method of non-codebook based PUSCH transmission according to an embodiment of the present application.

FIG. 6 illustrates a method 200 of non-codebook based PUSCH transmission according to an embodiment of the present application. In some embodiments, referring to FIG. 6 in conjunction with FIG. 4, the method 200 includes the following. In block 202 of the method 200, the UE 10 is provided (a TRP (e.g., the first TRP 20 or the second TRP 30) provides for the UE 10) with one or two sounding reference signal (SRS) request fields in downlink control information (DCI) to trigger a first aperiodic (AP) SRS resource set transmitted toward a first transmission/reception point (TRP) and a second AP SRS resource set transmitted toward a second TRP, in which the first AP SRS resource set and the second AP SRS resource set are configured with usage set to non-codebook based PUSCH transmission in multi-TRP/panel scenario. In block 204 of the method 200, the UE 10 performs (a TRP (e.g., the first TRP 20 or the second TRP 30) expects the UE 10 to perform) AP SRS transmission based on the first AP SRS resource set and the second AP SRS resource set. This can solve issues in the existing arts, realize non-codebook based PUSCH transmission in multi-TRP/panel scenario, and/or provide good communication performance.

In an embodiment of the present application, two SRS request fields are used to trigger the first AP SRS resource set and the second AP SRS resource set, respectively. More specifically, a first SRS request field of the two SRS request fields is used to trigger the first AP SRS resource set transmitted toward the first TRP and a second SRS request filed of the two SRS request fields is used to trigger the second AP SRS resource set transmitted toward the second TRP. Particularly, the first SRS request field is used to trigger the first AP SRS resource set among SRS resource sets for the first TRP, and the second SRS request field is used to trigger the second AP SRS resource set among SRS resource sets for the second TRP.

In one possible implementation of the present application, the first SRS request field in the DCI has at least two bits representing at least four values, and among the SRS resource sets for the first TRP, the first SRS resource set is the SRS resource set with an AP SRS triggering parameter set to the value indicated by the first SRS request field or an entry in an AP SRS triggering list parameter set to the value indicated by the first SRS request field. The second SRS request field in the DCI has at least two bits representing at least four values, and among the SRS resource sets for the second TRP, the second SRS resource set is the SRS resource set with an AP SRS triggering parameter set to the value indicated by the second SRS request field or an entry in an AP SRS triggering list parameter set to the value indicated by the second SRS request field.

In an embodiment of the present application, one SRS request field is used to trigger both the first AP SRS resource set and the second AP SRS resource set. More specifically, if a non-zero value of the one SRS request field is indicated, at least one AP SRS resource set is triggered and transmitted toward the first TRP and at least one AP SRS resource set is triggered and transmitted toward the second TRP.

In one possible implementation of the present application, the one SRS request field in the DCI has at least two bits, each value indicated by the at least two bits is mapped to the first AP SRS resource set and the second AP SRS resource set.

In an embodiment of the present application, associated CSI-RS resource for a first AP SRS transmission toward the first TRP is the most recent CSI-RS resource that satisfies time requirement, associated CSI-RS resource for the second AP SRS transmission toward the second TRP is the most recent CSI-RS resource that satisfies time requirement. More specifically, the associated CSI-RS resource for the first AP SRS transmission is from the first TRP and a time duration from the last symbol of reception of the most recent CSI-RS resource and the first symbol of the first AP SRS transmission toward the first TRP is not less than a gap; and the associated CSI-RS resource for the second AP SRS transmission is from the second TRP and a time duration from the last symbol of reception of the most recent CSI-RS resource and the first symbol of the second AP SRS transmission toward the second TRP is not less than a gap. For example, the gap is indicated by radio resource control (RRC) or UE capability.

In an embodiment of the present application, the one or two SRS request fields indicate associated CSI-RS resource for the AP SRS transmission. More specifically, the associated CSI-RS resource for the AP SRS transmission toward the first TRP is indicated by the SRS request field that triggered the first AP SRS resource set toward the first TRP, and the associated CSI-RS resource for the AP SRS transmission toward the second TRP is indicated by the SRS request field that triggered the second AP SRS resource set toward the second TRP. Particulary, the associated CSI-RS resource for the AP SRS transmission toward the first TRP is included in the first AP SRS resource set, and the associated CSI-RS resource for the AP SRS transmission toward the second TRP is included in the second AP SRS resource set.

In one possible implementation of the present application, in the case of two SRS request fields, the two SRS request fields are used to trigger the first AP SRS resource set and the second AP SRS resource set toward the first TRP and the second TRP respectively, the value of one of the two SRS request fields triggers the first AP SRS resource set and a CSI-RS resource index included in the first AP SRS resource set indicates the associated CSI-RS resource for the AP SRS transmission toward the first TRP; and the value of the other one of the two SRS request field triggers the second AP SRS resource set and a CSI-RS resource index included in the second AP SRS resource set indicates the associated CSI-RS resource for the AP SRS transmission toward the second TRP.

In one possible implementation of the present application, in the case of one SRS request field, the value of the SRS request field triggers both the first AP SRS resource set and the second AP SRS resource set transmitted toward the first TRP and the second TRP, a CSI-RS resource index included in the first AP SRS resource set indicates the associated CSI-RS resource for the AP SRS transmission toward the first TRP; and a CSI-RS resource index included in the second AP SRS resource set indicates the associated CSI-RS resource for the AP SRS transmission toward the second TRP.

In an embodiment of the present application, based on a measurement of the associated CSI-RS resource from the first TRP, a corresponding precoder is applied for the AP SRS transmission toward the first TRP; and based on a measurement of the associated CSI-RS resource from the second TRP, a corresponding precoder is applied for the AP SRS transmission toward the second TRP.

The embodiments of the present application will be described in more detail below.

Codebook Based PUSCH Transmission

In Rel-16, for codebook based PUSCH transmission in single-TRP/panel scenario, when the higher layer parameter ul-FullPowerTransmission is set to ‘fullpowerMode2’, the UE can be configured with one SRS resource or multiple SRS resources with different number of SRS ports within a SRS resource set which usage is set to ‘codebook’. Through the virtualization of Tx chains, UE can support full power transmission for each rank. However, for codebook based multi-TRP/panel based PUSCH repetition, since two SRS resource sets are configured for the two TRPs respectively, it is essential to define the rule to configure the number of SRS ports for the two SRS resource sets.

1. The Number of SRS Ports for all SRS Resources is the Same

Since a UE is most likely in a certain scenario, the channel between UE and TRP is relatively stable. Through the virtualization of Tx chains, the SRS resource with a dedicated number of port can enable full power transmission with a dedicated rank. If the UE is in another scenario, another number of SRS ports can be provided by RRC reconfiguration. Then a different virtualization of Tx chains can enable the full power transmission. Therefore, if the number of SRS ports for all resources in the two SRS resource sets is the same, the full power transmission for the PUSCH transmission can be achieved by different virtualizations. In addition, it is a simple and straightforward solution.

It is proposed that for codebook based PUSCH repetition in multi-TRP/panel scenario, when UL full power transmission switch (e.g. higher layer parameter ul-FullPowerTransmission) is set to full power mode 2 (e.g. higher layer parameter fullpowerMode2) and the two SRS resource sets corresponding to the first and second TRPs are configured with usage set to ‘codebook’, the number of SRS ports (e.g. higher layer parameters nrofSRS-Ports) for the SRS resources (e.g. higher layer parameters SRS-Resource) in the first SRS resource set (e.g. higher layer parameters SRS-ResourceSet) and the number of SRS ports (e.g. nrofSRS-Ports) for the SRS resources (e.g. SRS-Resource) in the second SRS resource set (e.g. SRS-ResourceSet) are configured with the same value. In other words, for all the SRS resources in the first and second SRS resource set, the number of SRS ports for all these SRS resources are the same.

Figure 7:
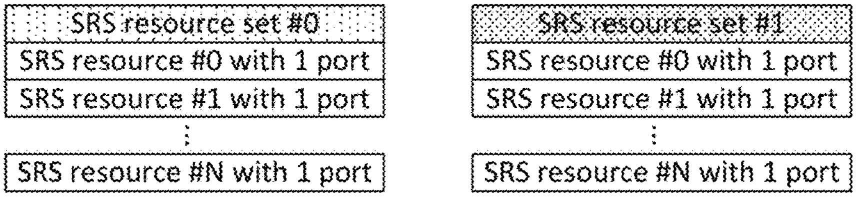
FIG. 7 is a schematic diagram illustrating SRS resources with port number of 1.
Figure 8:
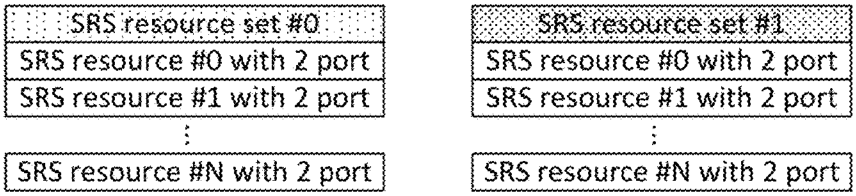
FIG. 8 is a schematic diagram illustrating SRS resources with port number of 2.
Figure 9:
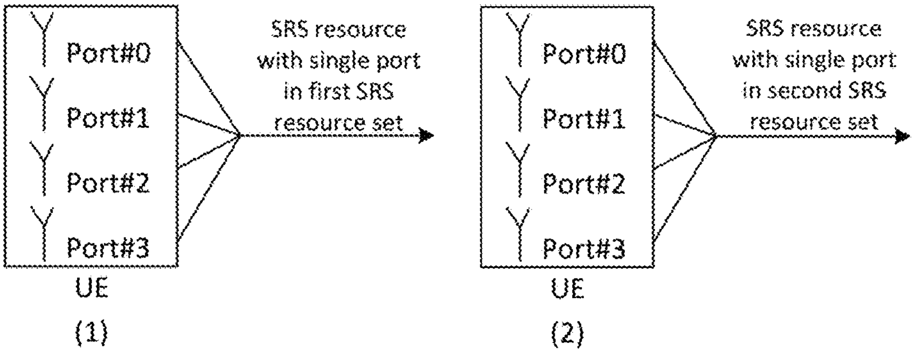
FIG. 9 is a schematic diagram illustrating virtualization of four Tx chains.
Figure 10:
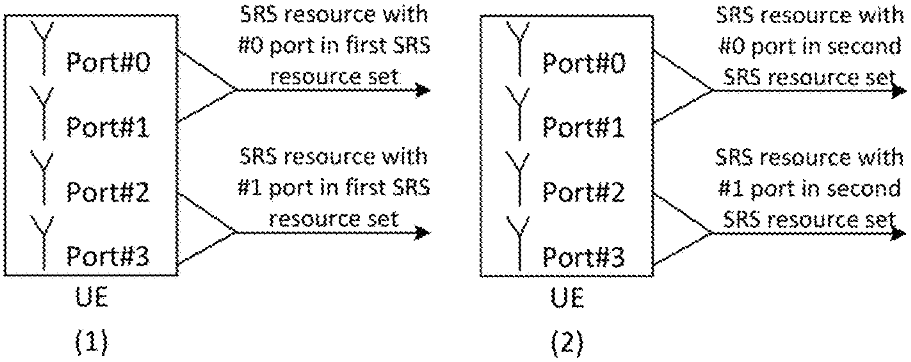
FIG. 10 is a schematic diagram illustrating virtualization of two Tx chains.

As shown in FIG. 7, the number of SRS ports of the SRS resources in the first and second SRS resource set is 1. As shown in FIG. 8, the number of SRS ports of the SRS resources in the first and second SRS resource set is 2. As shown in FIG. 9, the UE is configured with 4 Tx ports and UE can virtualize four Tx chains into one SRS port to support full power transmission in rank 1. By this way, UE can perform rank 1 PUSCH transmission toward the first TRP and second TRP respectively. When the UE is in another scenario, the SRS ports number of 2 in the first and second SRS resource set can be provided by RRC reconfiguration. As shown in FIG. 10, UE can virtualize two Tx chains into one of the two SRS ports and another two Tx chains into the other one of the two SRS ports to support full power transmission in rank 2. By this way, UE can perform rank 2 PUSCH transmission toward the first TRP and second TRP respectively.

2. The Number of SRS Ports for the SRS Resources with the Same Order is the Same If SRS resources in the first SRS resource set are configured with same or different number of SRS ports and SRS resources in the second SRS resource set are configured with same or different number of SRS ports, the Tx chains can be virtualized flexibly and better performance can be achieved. Since the number of SRS resources in the two SRS resource sets are the same, if the two SRS resources with the same order in the first and second SRS resource sets are configured with the same number of SRS ports, the similar virtualization of Tx chains into the SRS ports in the first and second SRS resource sets can be assumed. Through the flexible virtualization, the SRS resources with different number of SRS ports can enable full power transmission with each rank. Therefore, the SRS configurations can satisfy different scenarios and then the RRC overhead can be reduced.

It is proposed that for codebook based PUSCH repetition in multi-TRP/panel scenario, when UL full power transmission switch (e.g. higher layer parameter ul-FullPowerTransmission) is set to full power mode 2 (e.g. higher layer parameter fullpowerMode2) and the two SRS resource sets corresponding to the first and second TRPs are configured with usage set to ‘codebook’, SRS resources (e.g. higher layer parameters SRS-Resource) in the first SRS resource set (e.g. higher layer parameters SRS-ResourceSet) can be configured with same or different number of SRS ports (e.g. higher layer parameters nrofSRS-Ports) and SRS resources (e.g. SRS-Resource) in the second SRS resource set (e.g. SRS-ResourceSet) can be configured with same or different number of SRS ports (e.g. nrofSRS-Ports), moreover, the two SRS resources with the same order in the first and second SRS resource sets are configured with the same number of SRS ports.

Figure 11:
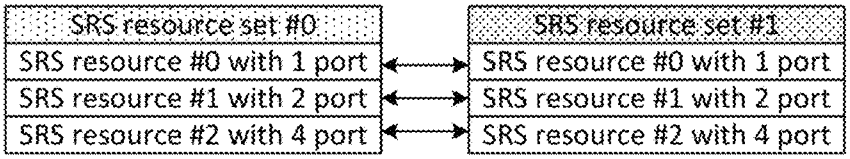
FIG. 11 is a schematic diagram illustrating SRS resources with the same order have the same number of port.

As shown in FIG. 11, the number of SRS resources in the first and second SRS resource sets is 3. In detail, the port number of the SRS resources with the first order in the first and second SRS resource sets is 1, the port number of the SRS resources with the second order in the first and second SRS resource sets is 2, and the port number of the SRS resources with the third order in the first and second SRS resource sets is 4.

If the channels toward the first and second TRP are similar, the similar virtualization of Tx chains into the SRS ports of SRS resources in the first and second SRS resource sets can be assumed. As shown in FIG. 9, the SRS resources with port number of 1 in the first and second SRS resource sets are used and UE can virtualize four Tx chains into one SRS port to support full power transmission in rank 1. By this way, UE can perform rank 1 PUSCH transmission toward the first TRP and second TRP respectively.

Figure 12:
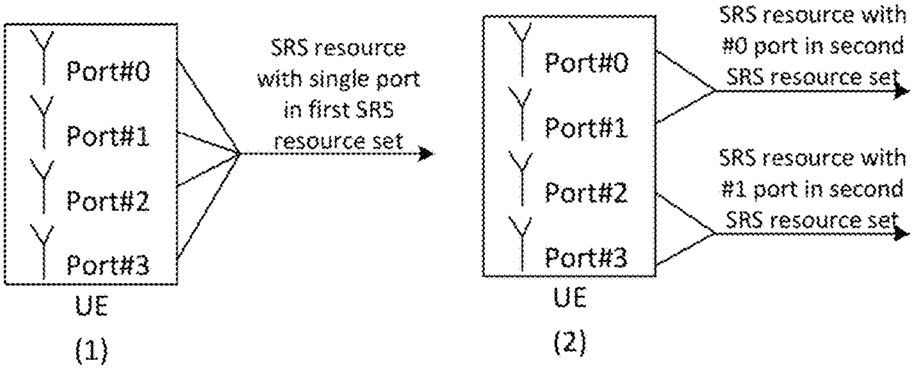
FIG. 12 is a schematic diagram illustrating virtualization of four and two Tx chains.

If the channels toward the first and second TRP are different, the different virtualization of Tx chains into the SRS ports of SRS resources in the first and second SRS resource sets can be assumed. As shown in FIG. 12, the SRS resource with port number of 1 in the first SRS resource set and the SRS resource with port number of 2 in the second SRS resource set are used. UE virtualizes four Tx chains into one SRS port to support full power transmission toward the first TRP with rank 1. Moreover, UE virtualizes two Tx chains into one of the two SRS ports and another two Tx chains into the other one of the two SRS ports to support full power transmission in rank 2. By this way, UE performs rank 1 PUSCH transmission toward the first TRP and rank 2 PUSCH transmission toward the second TRP respectively.

3. The Number of SRS Ports are Configured without Limitation

If SRS resources in the first SRS resource set are configured with same or different number of SRS ports and SRS resources in the second SRS resource set are configured with same or different number of SRS ports, the Tx chains can be virtualized flexibly and better performance can be achieved. Since the number of SRS resources in the two SRS resource sets are the same, if the number of SRS ports of SRS resources in the first and second SRS resource sets are configured independently (i.e., without limitation), the independent virtualization of Tx chains into the SRS ports of SRS resources in the first and second SRS resource sets can be assumed. Through the independent virtualization, the SRS resources with different number of SRS ports can enable full power transmission with each rank. Therefore, the independent SRS configurations can be applied to the different channels and then the RRC overhead can be further reduced.

It is proposed that for codebook based PUSCH repetition in multi-TRP/panel scenario, when UL full power transmission switch (e.g. higher layer parameter ul-FullPowerTransmission) is set to full power mode 2 (e.g. higher layer parameter fullpowerMode2) and the two SRS resource sets corresponding to the first and second TRPs are configured with usage set to 'codebook', SRS resources (e.g. higher layer parameters SRS-Resource) in the first SRS resource set (e.g. higher layer parameters SRS-ResourceSet) can be configured with same or different number of SRS ports (e.g. higher layer parameters nrofSRS-Ports) and SRS resources (e.g. SRS-Resource) in the second SRS resource set (e.g. SRS-ResourceSet) can be configured with same or different number of SRS ports (e.g. nrofSRS-Ports). In addition, the number of SRS ports of SRS resources in the first and second SRS resource sets are configured independently. In other words, there is no limitation on the relationship between the configuration of the number of SRS ports of SRS resources in the first SRS resource set and the configuration of the number of SRS ports of SRS resources in the second SRS resource set.

Figures 13, 14:
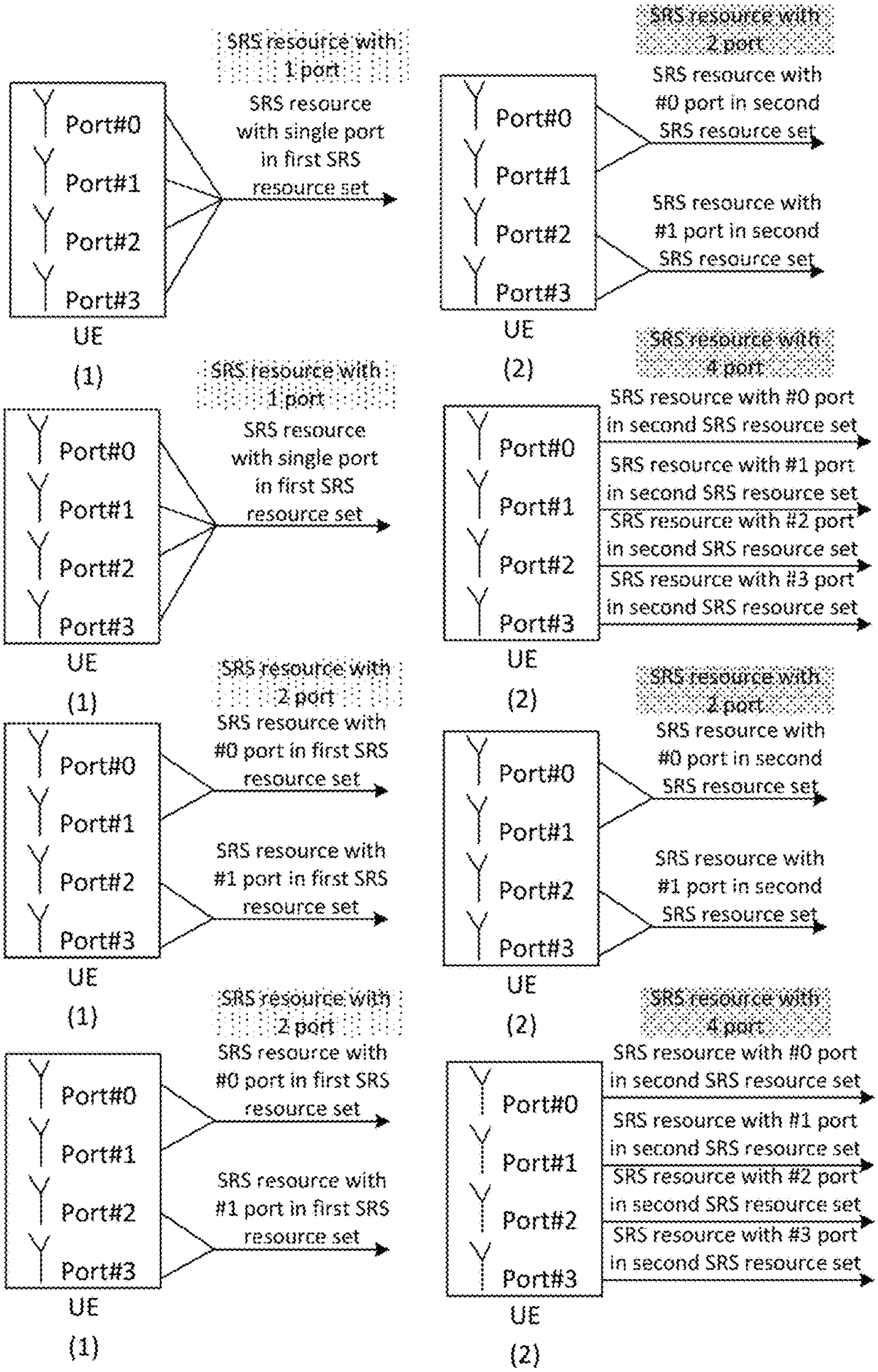
FIG. 13 is a schematic diagram illustrating the number of SRS ports are configured independently.
FIG. 14 is a schematic diagram illustrating all the virtualizations based on the SRS configurations.

As shown in FIG. 13, the number of SRS resources in the first and second SRS resource sets is 2. In detail, the port number of the first and second SRS resources in the first SRS resource sets is 1 and 2, while the port number of the first and second SRS resources in the second SRS resource sets is 2 and 4.

If the channels toward the first and second TRP are different, the different virtualization of Tx chains into the SRS ports of SRS resources in the first and second SRS resource sets can be assumed. As shown in FIG. 14, according to the SRS ports configurations of the first and second SRS resource sets, there are four virtualizations of Tx chains, i.e., rank 1 PUSCH transmission toward the first TRP and rank 2 PUSCH transmission toward the second TRP, rank 1 PUSCH transmission toward the first TRP and rank 4 PUSCH transmission toward the second TRP, rank 2 PUSCH transmission toward the first TRP and rank 2 PUSCH transmission toward the second TRP, rank 2 PUSCH transmission toward the first TRP and rank 4 PUSCH transmission toward the second TRP.

From the above example, if the number of SRS ports of SRS resources in the first and second SRS resource sets are configured independently, the same number of SRS resources can lead to more rank combinations, which is benefit for the different channels between UE and the first and second TRPs. By this way, the RRC overhead can be further reduced.

Non-Codebook Based PUSCH Transmission

1. AP SRS Resource Set Activation

For single DCI based PUSCH transmission toward two TRPs, two AP SRS resource sets can be triggered to measure the channel for PUSCH transmission. Regarding multi-TRP/panel based SRS resource set activation mechanism, two AP SRS resource sets should be triggered. Therefore, the mechanism should be designed to trigger two AP SRS resource sets transmitted toward multiple TRPs.

1.1 Two SRS Request Fields

For multi-TRP/panel based SRS resource set activation mechanism, if a second SRS request field is added in DCI to trigger the second AP SRS resource set transmitted toward the second TRP, the values of two SRS request fields are indicated independently. Therefore, the AP SRS resource sets transmitted toward the two TRPs can be flexibly triggered.

It is proposed that for multi-TRP/panel based AP SRS resource set activation mechanism, a second SRS request field with 2 bits is added in DCI (e.g., DCI format 0_1/0_2/1_1/1_2) to trigger the second AP SRS resource set transmitted toward the second TRP. In detail, among the SRS resource sets for the first TRP, the first SRS request field is used to trigger the AP SRS resource set transmitted toward the first TRP; among the SRS resource sets for the second TRP, the second SRS request field is used to trigger the AP SRS resource set transmitted toward the second TRP.

The detailed mapping between the first SRS request field and the first SRS resource set can be shown in Table 1. The detailed mapping between the second SRS request field and the second SRS resource set can be shown in Table 2.

TABLE 1

| The mapping between the first SRS request field and the first SRS resource set | |
|---|---|
| Value of the first SRS request field | Triggered AP SRS resource set toward the first TRP |
| 00 | No AP SRS resource set triggered |
| 01 | Among the SRS resource sets for the first TRP, the SRS resource set(s) (e.g., higher layer parameter SRS-ResourceSet or SRS-PosResourceSet) with AP SRS triggering parameter (e.g., higher layer parameter aperiodicSRS-ResourceTrigger) set to 1 or an entry in AP SRS triggering list parameter (e.g., higher layer parameter aperiodicSRS-ResourceTriggerList) set to 1 |
| 10 | Among the SRS resource sets for the first TRP, the SRS resource set(s) (e.g., SRS-ResourceSet or SRS-PosResourceSet) with AP SRS triggering parameter (e.g., aperiodicSRS-ResourceTrigger) set to 2 or an entry in AP SRS triggering list parameter (e.g., aperiodicSRS-ResourceTriggerList) set to 2 |
| 11 | Among the SRS resource sets for the first TRP, the SRS resource set(s) (e.g., SRS-ResourceSet or SRS-PosResourceSet) with AP SRS triggering parameter (e.g., aperiodicSRS-ResourceTrigger) set to 3 or an entry in AP SRS triggering list parameter (e.g., aperiodicSRS-ResourceTriggerList) set to 3 |

TABLE 2

| The mapping between the second SRS request field and the second SRS resource set | |
|---|---|
| Value of the second SRS request field | Triggered AP SRS resource set toward the second TRP |
| 00 | No AP SRS resource set triggered |
| 01 | Among the SRS resource sets for the second TRP, the SRS resource set(s) (e.g., higher layer parameter SRS-ResourceSet or SRS-PosResourceSet) with AP SRS triggering parameter (e.g., higher layer parameter aperiodicSRS-ResourceTrigger) set to 1 or an entry in AP SRS triggering list parameter (e.g., higher layer parameter aperiodicSRS-ResourceTriggerList) set to 1 |
| 10 | Among the SRS resource sets for the second TRP, the SRS resource set(s) (e.g., SRS-ResourceSet or SRS-PosResourceSet) with AP SRS triggering parameter (e.g., aperiodicSRS-ResourceTrigger) set to 2 or an entry in AP SRS triggering list parameter (e.g., aperiodicSRS-ResourceTriggerList) set to 2 |
| 11 | Among the SRS resource sets for the second TRP, the SRS resource set(s) (e.g., SRS-ResourceSet or SRS-PosResourceSet) with AP SRS triggering parameter (e.g., aperiodicSRS-ResourceTrigger) set to 3 or an entry in AP SRS triggering list parameter (e.g., aperiodicSRS-ResourceTriggerList) set to 3 |

As shown in Table 1, if the value of the first SRS request field is '11', among the SRS resource sets for the first TRP, the SRS resource set (e.g., SRS-ResourceSet) that is configured with AP SRS triggering parameter (e.g., aperiodicSRS-ResourceTrigger) set to 3 is triggered and UE transmits AP SRS resources of the triggered AP SRS resource set toward the first TRP.

As shown in Table 2, if the value of the second SRS request field is '11', among the SRS resource sets for the second TRP, the SRS resource set (e.g., SRS-ResourceSet) that is configured with AP SRS triggering parameter (e.g., aperiodicSRS-ResourceTrigger) set to 3 is triggered and UE transmits AP SRS resources of the triggered AP SRS resource set toward the second TRP.

1.2 One SRS Request Field

For multi-TRP/panel based SRS resource set activation mechanism, if the existing SRS request field in DCI is reused and the SRS request field can be mapped to the two AP SRS resource sets transmitted toward the first and second TRPs respectively, the DCI overhead can be reduced.

It is proposed that for multi-TRP/panel based AP SRS resource set activation mechanism, the SRS request field in DCI (e.g., DCI format 0_1/0_2/1_1/1_2) can be mapped to the first and second AP SRS resource sets transmitted toward the first and second TRPs respectively. For the values (i.e., '00', '01', '10', '11') of SRS request field, each value can be mapped to the first AP SRS resource set and the second AP SRS resource set, which are transmitted toward the first and second TRP respectively. In other words, if a non-zero value of SRS request field is indicated, at least one AP SRS resource set is triggered and transmitted toward the first TRP, meanwhile, at least one AP SRS resource set is triggered and transmitted toward the second TRP.

The detailed mapping between the SRS request field and the first and second SRS resource set can be shown in Table 3.

TABLE 3

| The mapping between the SRS request field and the first and second SRS resource set | |
|---|---|
| Value of the SRS request field | Triggered AP SRS resource sets toward the first and second TRPs |
| 00 | No AP SRS resource set triggered |
| 01 | Among the SRS resource sets for the first TRP, the SRS resource set(s) (e.g. higher layer parameter SRS-ResourceSet or SRS-PosResourceSet) with AP SRS triggering parameter (e.g. higher layer parameter aperiodicSRS-ResourceTrigger) set to 1 or an entry in AP SRS triggering list parameter (e.g. higher layer parameter aperiodicSRS-ResourceTriggerList) set to 1 is the first AP SRS resource set transmitted toward the first TRP; while among the SRS resource sets for the second TRP, the SRS resource set (e.g. SRS-ResourceSet or SRS-PosResourceSet) with AP SRS triggering parameter (e.g. aperiodicSRS-ResourceTrigger) set to 1 or an entry in AP SRS triggering list parameter (e.g. aperiodicSRS-ResourceTriggerList) set to 1 is the second AP SRS resource set transmitted toward the second TRP. |
| 10 | Among the SRS resource sets for the first TRP, the SRS resource set(s) (e.g. SRS-ResourceSet or SRS-PosResourceSet) with AP SRS triggering parameter (e.g. aperiodicSRS-ResourceTrigger) set to 2 or an entry in AP SRS triggering list parameter (e.g. aperiodicSRS-ResourceTriggerList) set to 2 is the first AP SRS resource set transmitted toward the first TRP; while among the SRS resource sets for the second TRP, the SRS resource set (e.g. SRS-ResourceSet or SRS-PosResourceSet) with AP SRS triggering parameter (e.g. aperiodicSRS-ResourceTrigger) set to 2 or an entry in AP SRS triggering list parameter (e.g. aperiodicSRS-ResourceTriggerList) set to 2 is the second AP SRS resource set transmitted toward the second TRP. |
| 11 | Among the SRS resource sets for the first TRP, the SRS resource set(s) (e.g. SRS-ResourceSet or SRS-PosResourceSet) with AP SRS triggering parameter (e.g. aperiodicSRS-ResourceTrigger) set to 3 or an entry in AP SRS triggering list parameter (e.g. aperiodicSRS-ResourceTriggerList) set to 3 is the first AP SRS resource set transmitted toward the first TRP; while among the SRS resource sets for the second TRP, the SRS resource set (e.g. SRS-ResourceSet or SRS-PosResourceSet) with AP SRS triggering parameter (e.g. aperiodicSRS-ResourceTrigger) set to 3 or an entry in AP SRS triggering list parameter (e.g. aperiodicSRS-ResourceTriggerList) set to 3 is the second AP SRS resource set transmitted toward the second TRP. |

As shown in Table 3, if the value of the SRS request field is '10', among the SRS resource sets for the first TRP, the SRS resource set (e.g. SRS-ResourceSet or SRS-PosResourceSet) with AP SRS triggering parameter (e.g. aperiodicSRS-ResourceTrigger) set to 2 or an entry in AP SRS triggering list parameter (e.g. aperiodicSRS-ResourceTriggerList) set to 2 is triggered and UE transmits AP SRS resources of the triggered AP SRS resource set toward the first TRP; while among the SRS resource sets for the second TRP, the SRS resource set (e.g. SRS-ResourceSet or SRS-PosResourceSet) with AP SRS triggering parameter (e.g. aperiodicSRS-ResourceTrigger) set to 2 or an entry in AP SRS triggering list parameter (e.g. aperiodicSRS-ResourceTriggerList) set to 2 is triggered and UE transmits AP SRS resources of the triggered AP SRS resource set toward the second TRP.

2. Configuration of the Associated CSI-RS

In Rel-15, for the non-codebook based PUSCH in single TRP scenario, since channel reciprocity is exploited, UE can apply the precoder for the SRS transmission based on the associated CSI-RS resource. For the multi-TRP/panel based scenario, since the channels toward the two TRPs may be different, it is essential to design different CSI-RS resources for the AP SRS transmissions toward two TRPs.

2.1 Associated with Most Recent CSI-RS Resource

If the CSI-RS resources for the AP SRS transmissions toward the two TRPs are the most recent CSI-RS resource that satisfies time requirement, it can reduce the signaling overhead and the measurement based on the CSI-RS is the most recent.

It is proposed that for non-codebook based PUSCH transmission in multi-TRP/panel scenario, the associated CSI-RS resource for the first AP SRS transmission toward the first TRP is the most recent CSI-RS resource that satisfies time requirement, where the CSI-RS resource is transmitted from the first TRP and the time duration from the last symbol of the reception of the most recent CSI-RS resource and the first symbol of the AP SRS transmission toward the first TRP is not less than the gap; while the associated CSI-RS resource for the second AP SRS transmission toward the second TRP is the most recent CSI-RS resource that satisfies time requirement, where the CSI-RS resource is transmitted from the second TRP and the time duration from the last symbol of the reception of the most recent CSI-RS resource and the first symbol of the AP SRS transmission toward the second TRP is not less than the gap. Here, the gap can be indicated by RRC or UE capability. For example, the gap can be 42 OFDM symbols.

Based on the measurement of the associated CSI-RS resource from the first TRP, UE can apply the corresponding precoder for the SRS transmission toward the first TRP. Based on the measurement of the associated CSI-RS resource from the second TRP, UE can apply the corresponding precoder for the SRS transmission toward the second TRP.

Figure 15:
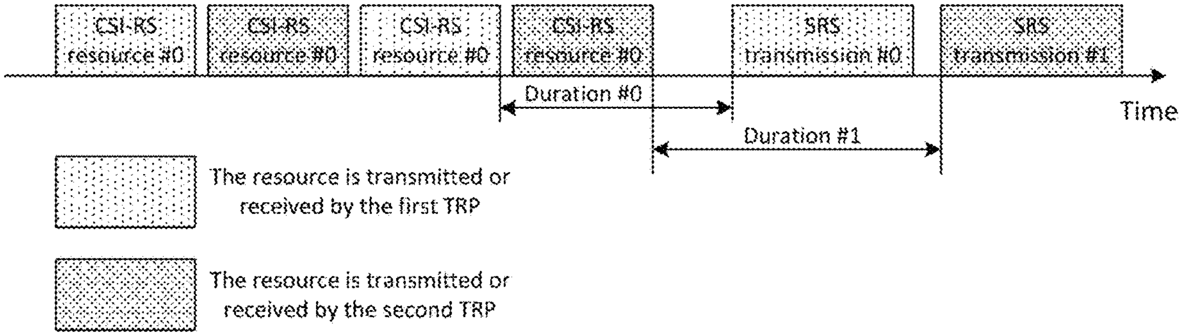
FIG. 15 is a schematic diagram illustrating associated with most recent CSI-RS resource.

As shown in FIG. 15, CSI-RS resource #0 and CSI-RS resource #2 are transmitted from the first TRP, and CSI-RS resource #0 and CSI-RS resource #2 satisfy the time requirement, i.e., the time duration from the last symbol of the reception of the CSI-RS resource #0 and CSI-RS resource #2 and the first symbol of the AP SRS transmission toward the first TRP is larger than the gap. The most recent CSI-RS resource from the first TRP is CSI-RS resource #2 and the measurement of CSI-RS resource #2 can be applied for the AP SRS transmission toward the first TRP. Similarly, the most recent CSI-RS resource from the second TRP is CSI-RS resource #3 and the measurement of CSI-RS resource #3 can be applied for the AP SRS transmission toward the second TRP.

2.2 Associated with the CSI-RS Indicated by SRS Request Field

Since the triggered AP SRS resource set is indicated by the SRS request field, if the associated CSI-RS is included in the AP SRS resource set (e.g., higher layer parameter SRS-ResourceSet), the associated CSI-RS resource for the SRS transmission can be indicated by the SRS request field. For the multi-TRP/panel based AP SRS resource set activation mechanism, since there may be one or more SRS request fields, indicating the associated CSI-RS resource by the SRS request field can simplify the process.

It is proposed that for non-codebook based PUSCH transmission in multi-TRP/panel scenario, the associated CSI-RS resource for the first AP SRS transmission toward the first TRP is indicated by the SRS request field that triggered the first AP SRS resource set toward the first TRP and the associated CSI-RS resource for the SRS transmission toward the first TRP can be included in the triggered AP SRS resource set (e.g. SRS-ResourceSet); while the associated CSI-RS resource for the second AP SRS transmission toward the second TRP is indicated by the SRS request field that triggered the second AP SRS resource set toward the second TRP and the associated CSI-RS resource for the SRS transmission toward the second TRP can be included in the triggered AP SRS resource set (e.g. SRS-ResourceSet).

In detail, if there are two SRS request fields and the SRS request fields are used to trigger the AP SRS resource sets toward the first and second TRP respectively, the value of the first SRS request field triggers at least one AP SRS resource set and the CSI-RS resource index included in the triggered AP SRS resource set indicates the associated CSI-RS resource for the SRS transmission toward the first TRP; while the value of the second SRS request field triggers at least one AP SRS resource set and the CSI-RS resource index included in the triggered AP SRS resource set indicates the associated CSI-RS resource for the SRS transmission toward the second TRP.

If there is only one SRS request field, the value of the SRS request field triggers the AP SRS resource sets transmitted toward the first and second TRPs. The CSI-RS resource index included in the triggered AP SRS resource set transmitted toward the first TRP indicates the associated CSI-RS resource for the SRS transmission toward the first TRP; while the CSI-RS resource index included in the triggered AP SRS resource set transmitted toward the second TRP indicates the associated CSI-RS resource for the SRS transmission toward the second TRP.

Commercial interests for some embodiments are as follows. 1. Solving issues in the prior art. 2. Realizing codebook based PUSCH transmission in multi-TRP/panel scenario. 3. Realizing non-codebook based PUSCH transmission in multi-TRP/panel scenario. 4. Providing a good communication performance. Some embodiments of the present application are used by 5G-NR chipset vendors, V2X communication system development vendors, automakers including cars, trains, trucks, buses, bicycles, motobikes, helmets, and etc., drones (unmanned aerial vehicles), smartphone makers, communication devices for public safety use, AR/VR device maker for example gaming, conference/seminar, education purposes. Some embodiments of the present application are a combination of “techniques/processes” that can be adopted in 3GPP specification to create an end product. Some embodiments of the present application could be adopted in the 5G NR unlicensed band communications. Some embodiments of the present application propose technical mechanisms.

The embodiment of the present application further provides a computer readable storage medium for storing a computer program. The computer readable storage medium enables a computer to execute corresponding processes implemented by the UE/BS in each of the methods of the embodiment of the present application. For brevity, details will not be described herein again.

The embodiment of the present application further provides a computer program product including computer program instructions. The computer program product enables a computer to execute corresponding processes implemented by the UE/BS in each of the methods of the embodiment of the present application. For brevity, details will not be described herein again.

The embodiment of the present application further provides a computer program. The computer program enables a computer to execute corresponding processes implemented by the UE/BS in each of the methods of the embodiment of the present application. For brevity, details will not be described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different approaches to implement the described functions for each particular application, but it should not be considered that the implementation goes beyond the scope of the present application.

While the present application has been described in connection with what is considered the most practical and preferred embodiments, it is understood that the present application is not limited to the disclosed embodiments but is intended to cover various arrangements made without departing from the scope of the broadest interpretation of the appended claims.

The invention claimed is:

1. A method of non-codebook based physical uplink shared channel (PUSCH) transmission, performed by a user equipment (UE), the method comprising:

being provided with one sounding reference signal (SRS) request field or two SRS request fields in downlink control information (DCI) to trigger a first aperiodic (AP) SRS resource set transmitted toward a first transmission/reception point (TRP) and a second AP SRS resource set transmitted toward a second TRP, wherein the first AP SRS resource set and the second AP SRS resource set are configured with usage set to non-codebook based PUSCH transmission in multi-TRP/panel scenario; and performing AP SRS transmission based on the first AP SRS resource set and the second AP SRS resource set, wherein a first associated channel state information reference signal (CSI-RS) resource for a first AP SRS transmission toward the first TRP is selected from CSI-RS resources transmitted from the first TRP, a first time requirement is satisfied by one of the CSI-RS resources transmitted from the first TRP when a time duration from a last symbol of reception of the one CSI-RS resource to a first symbol of the first AP SRS transmission toward the first TRP is not less than a gap, and the first associated CSI-RS resource is a most recent one of the CSI-RS resources transmitted from the first TRP that satisfies the first time requirement; and wherein a second associated CSI-RS resource for a second AP SRS transmission toward the second TRP is selected from CSI-RS resources transmitted from the second TRP, a second time requirement is satisfied by one of the CSI-RS resources transmitted from the second TRP when a time duration from a last symbol of reception of the one CSI-RS resource to a first symbol of the second AP SRS transmission toward the second TRP is not less than the gap, and the second associated CSI-RS resource is the most recent one of the CSI-RS resources transmitted from the second TRP that satisfies the second time requirement.

2. The method of claim 1, wherein one SRS request field is used to trigger both the first AP SRS resource set and the second AP SRS resource set.

3. The method of claim 2, wherein if a non-zero value of the one SRS request field is indicated, at least one AP SRS resource set is triggered and transmitted toward the first TRP and at least one AP SRS resource set is triggered and transmitted toward the second TRP.

4. The method of claim 2, wherein the one SRS request field in the DCI has at least two bits, each value indicated by the at least two bits is mapped to the first AP SRS resource set and the second AP SRS resource set.

5. The method of claim 1, further comprising:

applying, based on a measurement of the first associated CSI-RS resource, a corresponding precoder for the first AP SRS transmission toward the first TRP, and applying, based on a measurement of the second associated CSI-RS resource, a corresponding precoder for the second AP SRS transmission toward the second TRP.

6. The method of claim 1, wherein the first associated CSI-RS resource for the first AP SRS transmission is from the first TRP and a time duration from the last symbol of reception of the most recent one of the CSI-RS resources and the first symbol of the first AP SRS transmission toward the first TRP is not less than a gap; and the second associated CSI-RS resource for the second AP SRS transmission is from the second TRP and a time duration from the last symbol of reception of the most recent one of the CSI-RS resources and the first symbol of the second AP SRS transmission toward the second TRP is not less than a gap.

7. The method of claim 6, wherein the gap is indicated by radio resource control (RRC) or UE capability.

8. The method of claim 6, wherein the gap is 42 orthogonal frequency-division multiplexing (OFDM) symbols.

9. The method of claim 1, wherein the one SRS request field or the two SRS request fields in the DCI indicate the first associated CSI-RS resource and the second associated CSI-RS resource.

10. The method of claim 9, wherein when the two SRS request fields are provided, the first associated CSI-RS resource is indicated by a first SRS request field that triggers the first AP SRS resource set toward the first TRP, and the second associated CSI-RS resource is indicated by a second SRS request field that triggers the second AP SRS resource set toward the second TRP.

11. The method of claim 10, wherein the first associated CSI-RS resource is included in the first AP SRS resource set, and the second associated CSI-RS resource is included in the second AP SRS resource set.

12. The method of claim 9, wherein when the two SRS request fields are provided, a value indicated by a first SRS request field of the two SRS request fields triggers the first AP SRS resource set and a CSI-RS resource index included in the first AP SRS resource set indicates the first associated CSI-RS resource; and a value indicated by a second SRS request field of the two SRS request field triggers the second AP SRS resource set and a CSI-RS resource index included in the second AP SRS resource set indicates the associated CSI-RS resource.

13. The method of claim 9, wherein when the one SRS request field is provided, a value indicated by the one SRS request field triggers both the first AP SRS resource set and the second AP SRS resource set, a CSI-RS resource index included in the first AP SRS resource set indicates the first associated CSI-RS resource; and a CSI-RS resource index included in the second AP SRS resource set indicates the second associated CSI-RS resource.

14. A user equipment (UE), communicating with a transmission/reception point (TRP) in a network, the UE comprising a processor, configured to call and run program instructions stored in a memory, to execute the method of claim 1.

15. A method of enabling a user equipment (UE) to perform non-codebook based physical uplink shared channel (PUSCH) transmission, performed by a transmission/reception point (TRP), the method comprising:

providing for the UE one sounding reference signal (SRS) request field or two SRS request fields in downlink control information (DCI) to trigger a first aperiodic (AP) SRS resource set transmitted toward a first transmission/reception point (TRP) and a second AP SRS resource set transmitted toward a second TRP, in which the first AP SRS resource set and the second AP SRS resource set are configured with usage set to non-codebook based PUSCH transmission in multi-TRP/panel scenario; and expecting the UE to perform AP SRS transmission based on the first AP SRS resource set and the second AP SRS resource set, wherein a first associated channel state information reference signal (CSI-RS) resource for a first AP SRS transmission toward the first TRP is selected from CSI-RS resources transmitted from the first TRP, a first time requirement is satisfied by one of the CSI-RS resources transmitted from the first TRP when a time duration from a last symbol of reception of the one CSI-RS resource to a first symbol of the first AP SRS transmission toward the first TRP is not less than a gap, and the first associated CSI-RS resource is a most recent one of the CSI-RS resources transmitted from the first TRP that satisfies the first time requirement; and wherein a second associated CSI-RS resource for a second AP SRS transmission toward the second TRP is selected from CSI-RS resources transmitted from the second TRP, a second time requirement is satisfied by one of the CSI-RS resources transmitted from the second TRP when a time duration from a last symbol of reception of the one CSI-RS resource to a first symbol of the second AP SRS transmission toward the second TRP is not less than the gap, and the second associated CSI-RS resource is the most recent one of the CSI-RS resources transmitted from the second TRP that satisfies the second time requirement.

16. A a transmission/reception point (TRP), communicating with a user equipment (UE) in a network, the TRP comprising a processor, configured to call and run program instructions stored in a memory, to execute the method of claim 15.

* * * * *